US008429465B2

(12) United States Patent
Gu et al.

(10) Patent No.: US 8,429,465 B2
(45) Date of Patent: Apr. 23, 2013

(54) METHOD, DEVICE AND SYSTEM FOR MANAGING RESOURCES IN NETWORKS

(75) Inventors: Huailong Gu, Shenzhen (CN); Jun Li, Shenzhen (CN); Dongsheng Yue, Shenzhen (CN); Yiming Wang, Shenzhen (CN); Fuqing Huang, Shenzhen (CN); Zhenzhu Lv, Shenzhen (CN); Ting Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 12/801,948

(22) Filed: Jul. 2, 2010

(65) Prior Publication Data

US 2010/0275068 A1 Oct. 28, 2010

Related U.S. Application Data

(63) Continuation of application No. PCT/CN2009/070100, filed on Jan. 12, 2009.

(30) Foreign Application Priority Data

Jan. 11, 2008 (CN) .......................... 2008 1 0065194

(51) Int. Cl.
*G06F 11/00* (2006.01)

(52) U.S. Cl.
USPC ............................................................ 714/48

(58) Field of Classification Search .................. 709/229; 726/1; 714/4.1, 48, 6
See application file for complete search history.

(56) References Cited

U.S. PATENT DOCUMENTS

| | | | | |
|---|---|---|---|---|
| 6,765,907 | B1 * | 7/2004 | Xu et al. | 370/390 |
| 2001/0032168 | A1 * | 10/2001 | Adamson et al. | 705/37 |
| 2001/0047421 | A1 * | 11/2001 | Sridhar et al. | 709/230 |
| 2005/0261984 | A1 * | 11/2005 | Hutchison et al. | 705/26 |
| 2007/0147292 | A1 | 6/2007 | Van Ewijk et al. | |
| 2009/0240811 | A1 | 9/2009 | Wei et al. | |
| 2009/0257353 | A1 * | 10/2009 | Song et al. | 370/241 |
| 2010/0103934 | A1 | 4/2010 | Li et al. | |

FOREIGN PATENT DOCUMENTS

| | | |
|---|---|---|
| CN | 1992628 | 7/2007 |
| CN | 101350763 | 1/2009 |
| CN | 101374061 | 2/2009 |
| EP | 1777896 | 4/2007 |

OTHER PUBLICATIONS

Written Opinion of the International Searching Authority, mailed Apr. 9, 2009, in corresponding International Application No. PCT/CN2009/070100.

(Continued)

*Primary Examiner* — Scott Baderman
*Assistant Examiner* — Yair Leibovich
(74) *Attorney, Agent, or Firm* — Staas & Halsey LLP

(57) ABSTRACT

A method, device and system for managing resources in networks are provided, which relate to the field of data communication. The method includes the following steps. A resource manager (RM) sends a first request message according to a received resource request message, to request an access node (AN) to perform admission control. After receiving an admission control result indicating whether a resource requested by the resource request message is admitted, the RM sends a response message of the resource request message. Therefore, when multicast/unicast connection admission control (CAC) that supports shared bandwidth is realized, flow fusions of user line configuration between the AN and a broadband remote access system (BRAS, and policy distribution between a resource and admission control subsystem (RACS) and the BRAS are guaranteed; and sharing of bandwidth resources is realized to avoid waste of the bandwidth resources.

6 Claims, 14 Drawing Sheets
(8 of 14 Drawing Sheet(s) Filed in Color)

OTHER PUBLICATIONS

Extended European Search Report, mailed Nov. 12, 2010, in corresponding European Application No. 09702796.5.

*Telecommunications and Internet Converged Services and Protocols for Advanced Networking (TISPAN); Resource and Admission Control Sub-System (RACS); Functional Architecture*, ETSI ES 282 003 V2.1.0 (Jun. 2006), pp. 1-24.

Ooghe, S. et al., *Framework and Requirements for an Access Node Control Mechanism in Broadband Multi-Service Networks*, Network Working Group, Nov. 15, 2007, pp. 1-41.

*Restructured and Edited Version of IPTV Multicast Frameworks Working Document*, $7^{th}$ FG IPTV meeting: Dec. 11-18, 2007, pp. 1-55.

Ooghe, S. et al., *Framework and Requirements for an Access Node Control Mechanism in Broadband Multi-Service Networks*, Network Working Group, Nov. 15, 2007 (pp. 1-41).

Wadha, S. et al., *Protocol for Access Node Control Mechanism in Broadband Networks*, IETF Trust, Jul. 9, 2007 (pp. 1-36).

International Search Report, mailed Apr. 9, 2009, in corresponding International Application No. PCT/CN2009/070100 (6 pp.).

Communication Pursuant to Article 94(3) EPC, mailed Aug. 1, 2011, in corresponding European Application No. 09702796.5 (6 pp.).

Office Action, mailed Sep. 26, 2011, in corresponding Chinese Application No. 200980101428.2 (13 pp.).

* cited by examiner

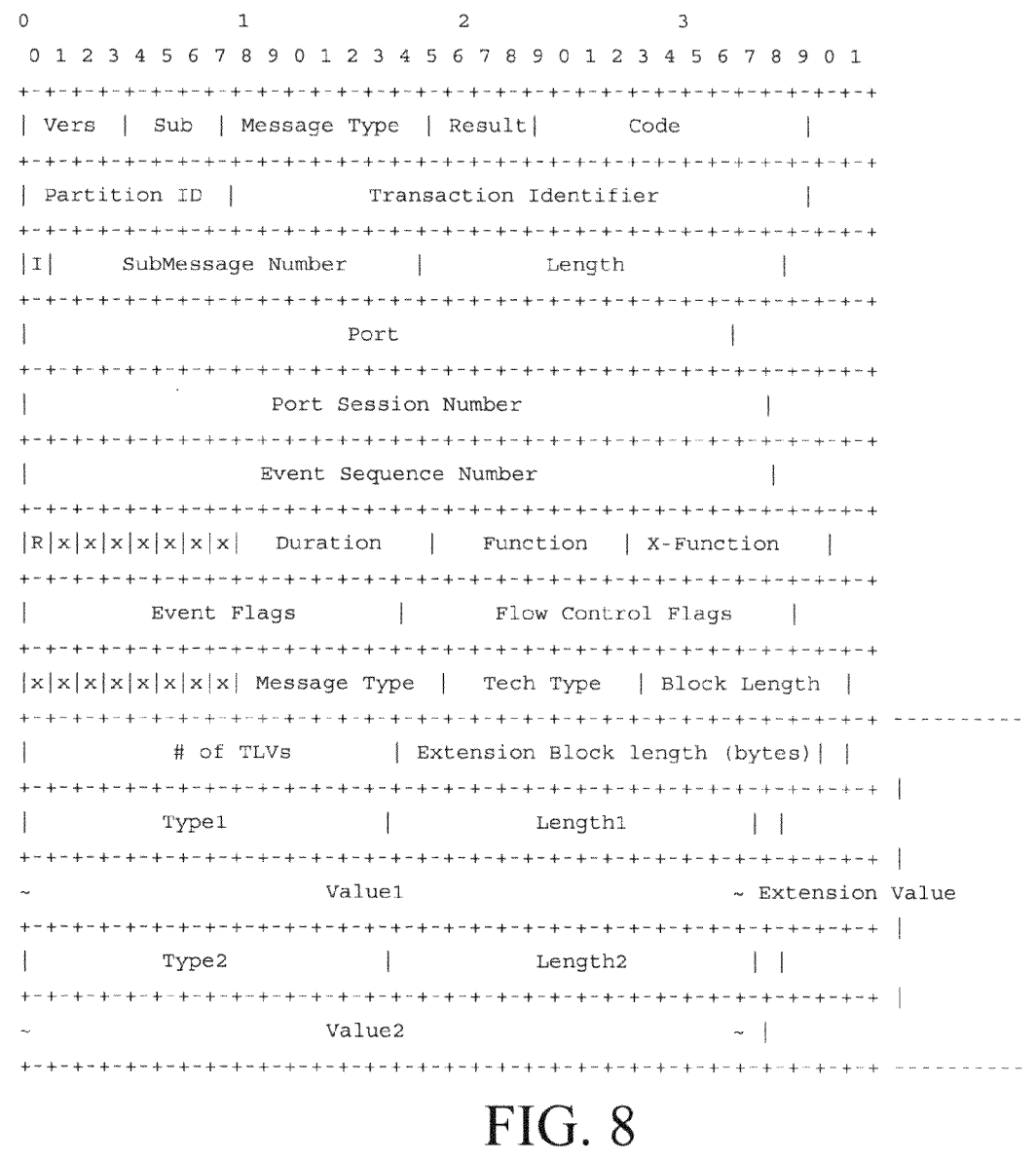

```
0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers  |  Sub  | Message Type  | Result|       Code            |
+-+-+-+-+-+-+-+-+-+-+-+-+-+-+-+-+-+-+-+-+-+-+-+-+-+-+-+-+-+-+-+-+
| Partition ID  |           Transaction Identifier              |
+-+-+-+-+-+-+-+-+-+-+-+-+-+-+-+-+-+-+-+-+-+-+-+-+-+-+-+-+-+-+-+-+
|I|     SubMessage Number       |           Length              |
+-+-+-+-+-+-+-+-+-+-+-+-+-+-+-+-+-+-+-+-+-+-+-+-+-+-+-+-+-+-+-+-+
|                               Port                            |
+-+-+-+-+-+-+-+-+-+-+-+-+-+-+-+-+-+-+-+-+-+-+-+-+-+-+-+-+-+-+-+-+
|                      Port Session Number                      |
+-+-+-+-+-+-+-+-+-+-+-+-+-+-+-+-+-+-+-+-+-+-+-+-+-+-+-+-+-+-+-+-+
|                     Event Sequence Number                     |
+-+-+-+-+-+-+-+-+-+-+-+-+-+-+-+-+-+-+-+-+-+-+-+-+-+-+-+-+-+-+-+-+
|R|x|x|x|x|x|x|x|   Duration    |   Function    | X-Function    |
+-+-+-+-+-+-+-+-+-+-+-+-+-+-+-+-+-+-+-+-+-+-+-+-+-+-+-+-+-+-+-+-+
|          Event Flags          |       Flow Control Flags      |
+-+-+-+-+-+-+-+-+-+-+-+-+-+-+-+-+-+-+-+-+-+-+-+-+-+-+-+-+-+-+-+-+
|x|x|x|x|x|x|x|x| Message Type  |   Tech Type   | Block Length  |
+-+-+-+-+-+-+-+-+-+-+-+-+-+-+-+-+-+-+-+-+-+-+-+-+-+-+-+-+-+-+-+-+ ----------
|           # of TLVs           | Extension Block length (bytes)| |
+-+-+-+-+-+-+-+-+-+-+-+-+-+-+-+-+-+-+-+-+-+-+-+-+-+-+-+-+-+-+-+-+ |
|           Type1               |           Length1             | |
+-+-+-+-+-+-+-+-+-+-+-+-+-+-+-+-+-+-+-+-+-+-+-+-+-+-+-+-+-+-+-+-+ |
~                             Value1                            ~ Extension Value
+-+-+-+-+-+-+-+-+-+-+-+-+-+-+-+-+-+-+-+-+-+-+-+-+-+-+-+-+-+-+-+-+ |
|           Type2               |           Length2             | |
+-+-+-+-+-+-+-+-+-+-+-+-+-+-+-+-+-+-+-+-+-+-+-+-+-+-+-+-+-+-+-+-+ |
~                             Value2                            ~ |
+-+-+-+-+-+-+-+-+-+-+-+-+-+-+-+-+-+-+-+-+-+-+-+-+-+-+-+-+-+-+-+-+ ----------
```

FIG. 8

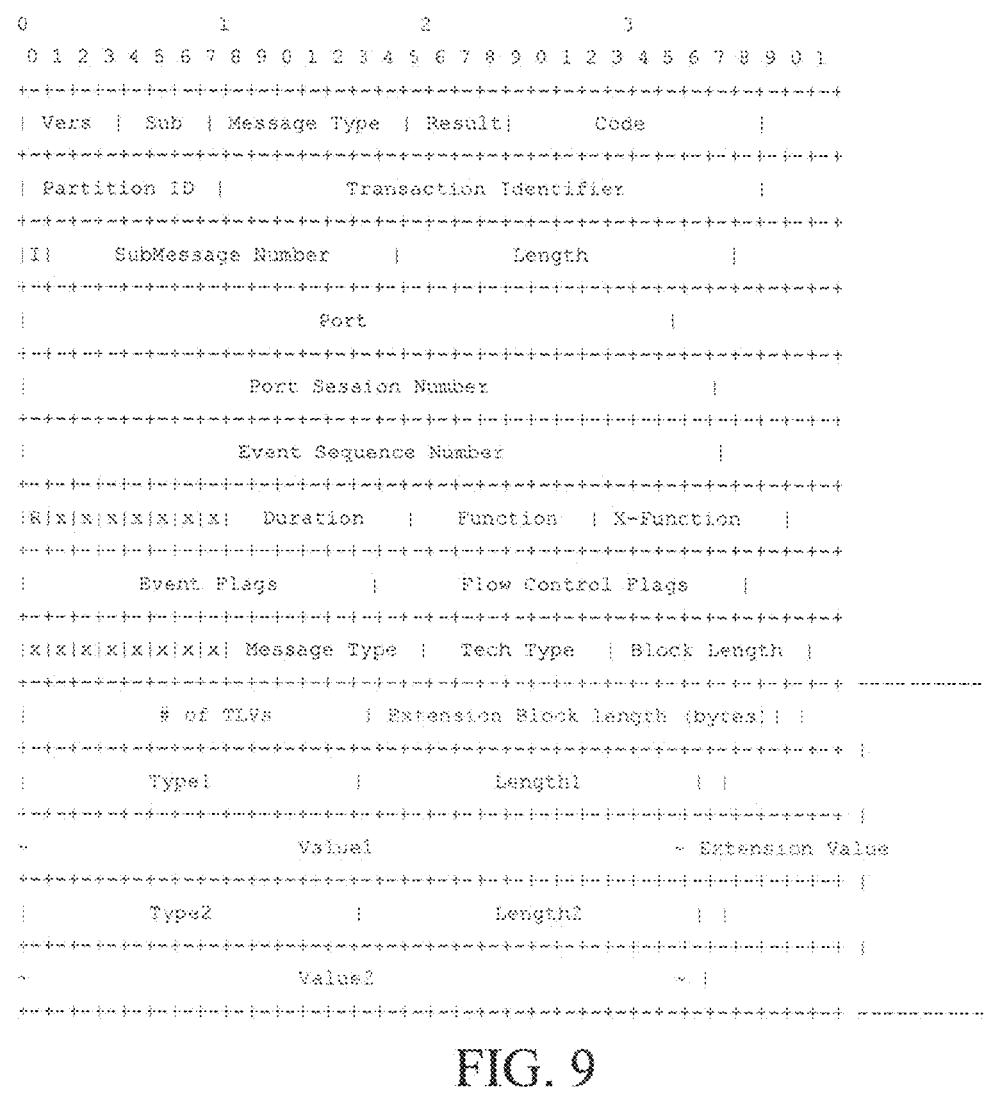

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers  |  Sub  | Message Type  | Result|       Code            |
+-+-+-+-+-+-+-+-+-+-+-+-+-+-+-+-+-+-+-+-+-+-+-+-+-+-+-+-+-+-+-+-+
| Partition ID  |           Transaction Identifier              |
+-+-+-+-+-+-+-+-+-+-+-+-+-+-+-+-+-+-+-+-+-+-+-+-+-+-+-+-+-+-+-+-+
|I|     SubMessage Number       |           Length              |
+-+-+-+-+-+-+-+-+-+-+-+-+-+-+-+-+-+-+-+-+-+-+-+-+-+-+-+-+-+-+-+-+
|                            Port                         |
+-+-+-+-+-+-+-+-+-+-+-+-+-+-+-+-+-+-+-+-+-+-+-+-+-+-+-+-+-+-+-+-+
|                    Port Session Number                          |
+-+-+-+-+-+-+-+-+-+-+-+-+-+-+-+-+-+-+-+-+-+-+-+-+-+-+-+-+-+-+-+-+
|                   Event Sequence Number                         |
+-+-+-+-+-+-+-+-+-+-+-+-+-+-+-+-+-+-+-+-+-+-+-+-+-+-+-+-+-+-+-+-+
|R|x|x|x|x|x|x|x|   Duration    |    Function   | X-Function    |
+-+-+-+-+-+-+-+-+-+-+-+-+-+-+-+-+-+-+-+-+-+-+-+-+-+-+-+-+-+-+-+-+
|          Event Flags          |       Flow Control Flags      |
+-+-+-+-+-+-+-+-+-+-+-+-+-+-+-+-+-+-+-+-+-+-+-+-+-+-+-+-+-+-+-+-+
|x|x|x|x|x|x|x|x| Message Type  |   Tech Type   | Block Length  |
+-+-+-+-+-+-+-+-+-+-+-+-+-+-+-+-+-+-+-+-+-+-+-+-+-+-+-+-+-+-+-+-+  ------------
|           # of TLVs           | Extension Block length (bytes)| |
+-+-+-+-+-+-+-+-+-+-+-+-+-+-+-+-+-+-+-+-+-+-+-+-+-+-+-+-+-+-+-+-+  |
|           Type1               |             Length1         | |
+-+-+-+-+-+-+-+-+-+-+-+-+-+-+-+-+-+-+-+-+-+-+-+-+-+-+-+-+-+-+-+-+  |
~                        Value1                             ~ Extension Value
+-+-+-+-+-+-+-+-+-+-+-+-+-+-+-+-+-+-+-+-+-+-+-+-+-+-+-+-+-+-+-+-+  |
|           Type2               |             Length2         | |
+-+-+-+-+-+-+-+-+-+-+-+-+-+-+-+-+-+-+-+-+-+-+-+-+-+-+-+-+-+-+-+-+  |
~                        Value2                             ~ |
+-+-+-+-+-+-+-+-+-+-+-+-+-+-+-+-+-+-+-+-+-+-+-+-+-+-+-+-+-+-+-+-+  ------------
```

FIG. 9

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers  |  Sub  | Message Type  | Result|        Code           |
+-+-+-+-+-+-+-+-+-+-+-+-+-+-+-+-+-+-+-+-+-+-+-+-+-+-+-+-+-+-+-+-+
| Partition ID  |          Transaction Identifier               |
+-+-+-+-+-+-+-+-+-+-+-+-+-+-+-+-+-+-+-+-+-+-+-+-+-+-+-+-+-+-+-+-+
|I|     SubMessage Number       |           Length              |
+-+-+-+-+-+-+-+-+-+-+-+-+-+-+-+-+-+-+-+-+-+-+-+-+-+-+-+-+-+-+-+-+
|                            Port                               |
+-+-+-+-+-+-+-+-+-+-+-+-+-+-+-+-+-+-+-+-+-+-+-+-+-+-+-+-+-+-+-+-+
|                     Port Session Number                       |
+-+-+-+-+-+-+-+-+-+-+-+-+-+-+-+-+-+-+-+-+-+-+-+-+-+-+-+-+-+-+-+-+
|                    Event Sequence Number                      |
+-+-+-+-+-+-+-+-+-+-+-+-+-+-+-+-+-+-+-+-+-+-+-+-+-+-+-+-+-+-+-+-+
|R|z|x|x|x|x|x|x|   Duration    |   Function    | X-Function    |
+-+-+-+-+-+-+-+-+-+-+-+-+-+-+-+-+-+-+-+-+-+-+-+-+-+-+-+-+-+-+-+-+
|          Event Flags          |      Flow Control Flags       |
+-+-+-+-+-+-+-+-+-+-+-+-+-+-+-+-+-+-+-+-+-+-+-+-+-+-+-+-+-+-+-+-+
|x|x|x|x|x|x|x|x| Message Type  |   Tech Type   | Block Length  |
+-+-+-+-+-+-+-+-+-+-+-+-+-+-+-+-+-+-+-+-+-+-+-+-+-+-+-+-+-+-+-+-+  ----------
|           # of TLVs           | Extension Block length (bytes)| |
+-+-+-+-+-+-+-+-+-+-+-+-+-+-+-+-+-+-+-+-+-+-+-+-+-+-+-+-+-+-+-+-+  |
|           Type1               |           Length1             | |
+-+-+-+-+-+-+-+-+-+-+-+-+-+-+-+-+-+-+-+-+-+-+-+-+-+-+-+-+-+-+-+-+  |
~                        Value1                                 ~ Extension Value
+-+-+-+-+-+-+-+-+-+-+-+-+-+-+-+-+-+-+-+-+-+-+-+-+-+-+-+-+-+-+-+-+  |
|           Type2               |           Length2             | |
+-+-+-+-+-+-+-+-+-+-+-+-+-+-+-+-+-+-+-+-+-+-+-+-+-+-+-+-+-+-+-+-+  |
~                        Value2                                 ~ |
+-+-+-+-+-+-+-+-+-+-+-+-+-+-+-+-+-+-+-+-+-+-+-+-+-+-+-+-+-+-+-+-+  ----------
```

FIG. 10

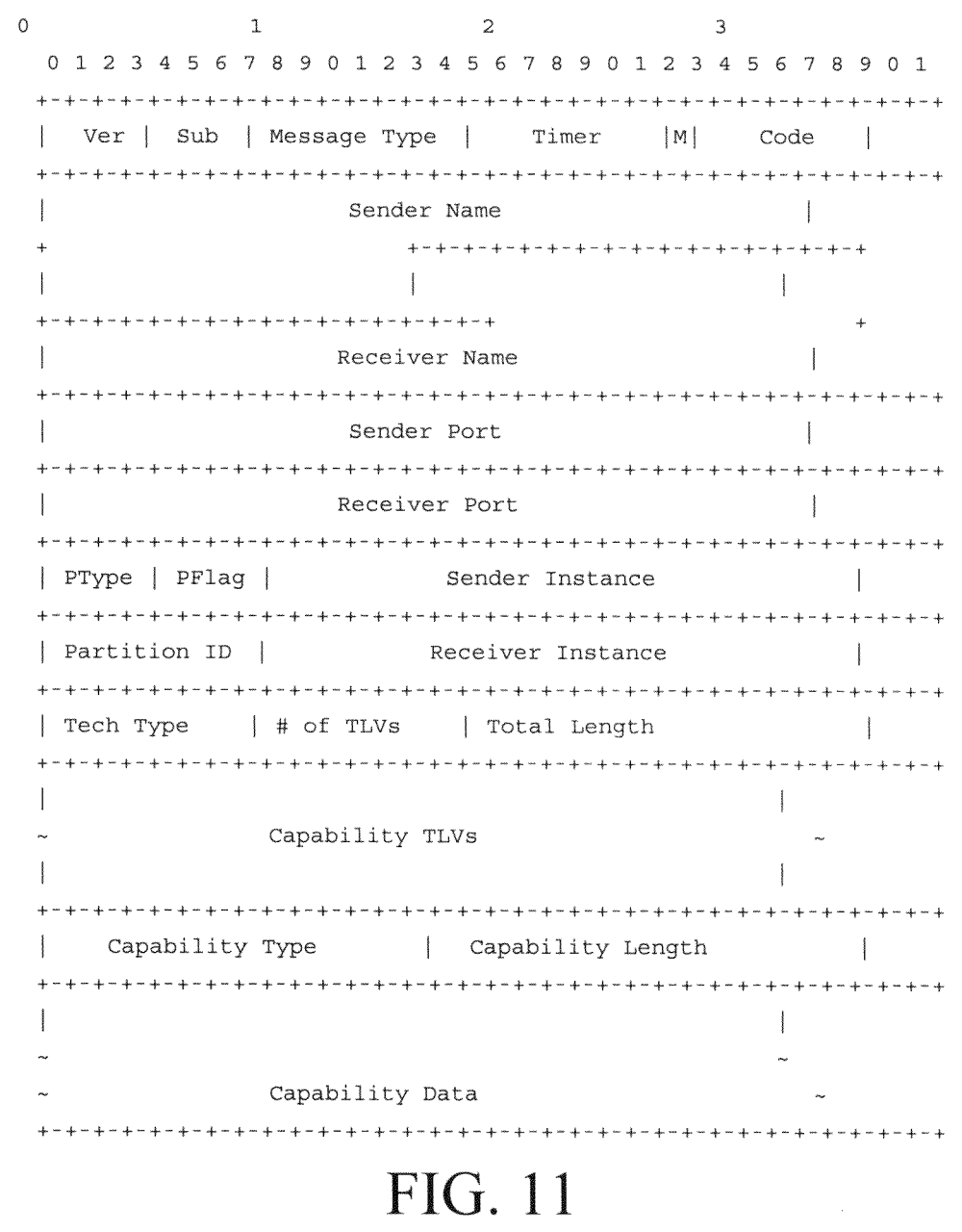

```
0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Ver  |  Sub  | Message Type  |     Timer     |M|     Code    |
+-+-+-+-+-+-+-+-+-+-+-+-+-+-+-+-+-+-+-+-+-+-+-+-+-+-+-+-+-+-+-+-+
|                      Sender Name                           |
+                         +-+-+-+-+-+-+-+-+-+-+-+-+-+-+-+-+-+
|                         |                          |
+-+-+-+-+-+-+-+-+-+-+-+-+-+-+-+-+-+                        +
|                     Receiver Name                           |
+-+-+-+-+-+-+-+-+-+-+-+-+-+-+-+-+-+-+-+-+-+-+-+-+-+-+-+-+-+-+-+-+
|                      Sender Port                           |
+-+-+-+-+-+-+-+-+-+-+-+-+-+-+-+-+-+-+-+-+-+-+-+-+-+-+-+-+-+-+-+-+
|                     Receiver Port                           |
+-+-+-+-+-+-+-+-+-+-+-+-+-+-+-+-+-+-+-+-+-+-+-+-+-+-+-+-+-+-+-+-+
| PType | PFlag |            Sender Instance                  |
+-+-+-+-+-+-+-+-+-+-+-+-+-+-+-+-+-+-+-+-+-+-+-+-+-+-+-+-+-+-+-+-+
| Partition ID  |           Receiver Instance                 |
+-+-+-+-+-+-+-+-+-+-+-+-+-+-+-+-+-+-+-+-+-+-+-+-+-+-+-+-+-+-+-+-+
| Tech Type     | # of TLVs     | Total Length                  |
+-+-+-+-+-+-+-+-+-+-+-+-+-+-+-+-+-+-+-+-+-+-+-+-+-+-+-+-+-+-+-+-+
|                                                          |
~                Capability TLVs                             ~
|                                                          |
+-+-+-+-+-+-+-+-+-+-+-+-+-+-+-+-+-+-+-+-+-+-+-+-+-+-+-+-+-+-+-+-+
|    Capability Type         |  Capability Length            |
+-+-+-+-+-+-+-+-+-+-+-+-+-+-+-+-+-+-+-+-+-+-+-+-+-+-+-+-+-+-+-+-+
|                                                          |
~                                                          ~
~                Capability Data                             ~
+-+-+-+-+-+-+-+-+-+-+-+-+-+-+-+-+-+-+-+-+-+-+-+-+-+-+-+-+-+-+-+-+
```

FIG. 11

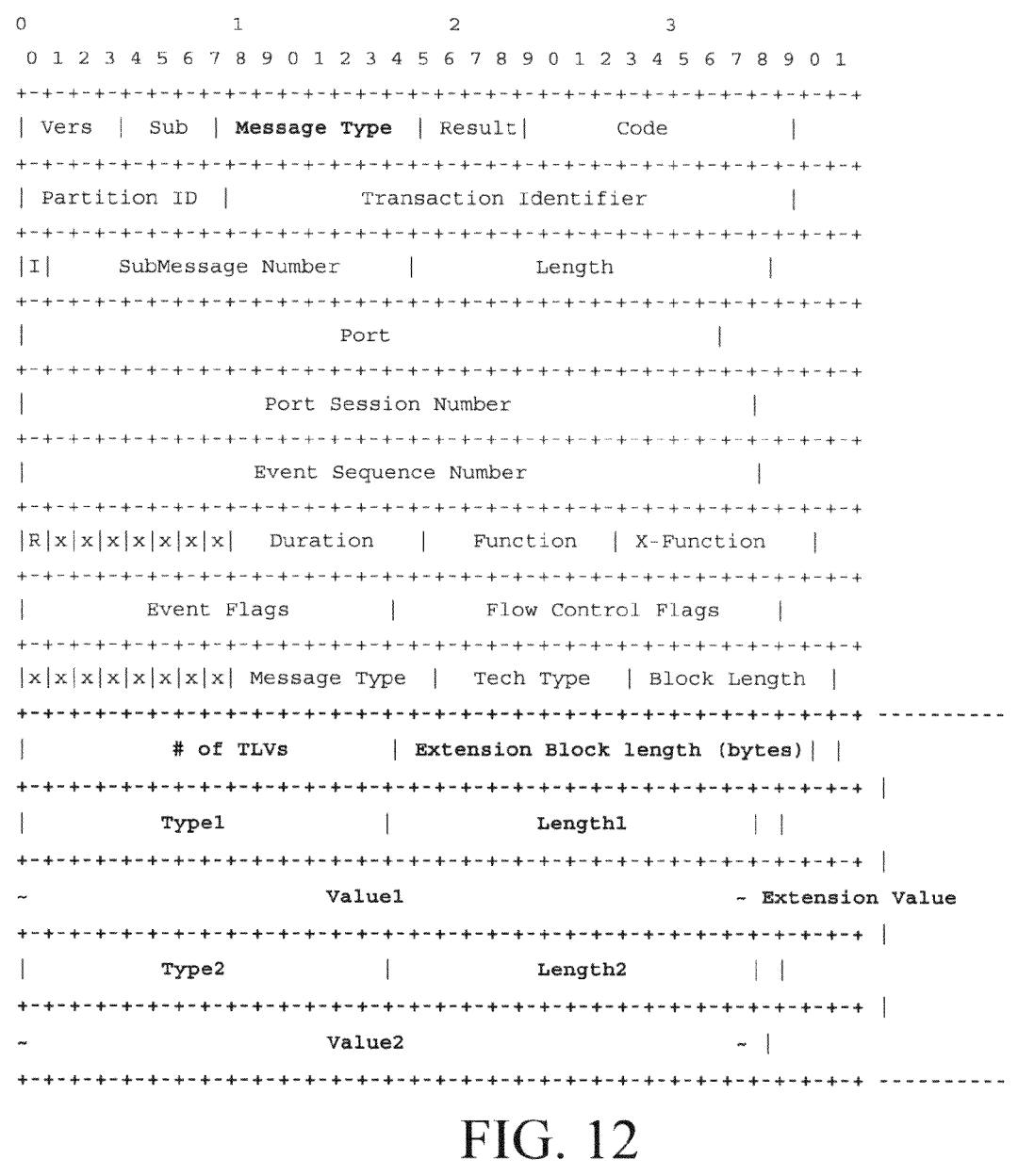

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers  |  Sub  | Message Type  | Result|        Code           |
+-+-+-+-+-+-+-+-+-+-+-+-+-+-+-+-+-+-+-+-+-+-+-+-+-+-+-+-+-+-+-+-+
| Partition ID  |           Transaction Identifier              |
+-+-+-+-+-+-+-+-+-+-+-+-+-+-+-+-+-+-+-+-+-+-+-+-+-+-+-+-+-+-+-+-+
|I|     SubMessage Number       |           Length              |
+-+-+-+-+-+-+-+-+-+-+-+-+-+-+-+-+-+-+-+-+-+-+-+-+-+-+-+-+-+-+-+-+
|                              Port                             |
+-+-+-+-+-+-+-+-+-+-+-+-+-+-+-+-+-+-+-+-+-+-+-+-+-+-+-+-+-+-+-+-+
|                     Port Session Number                       |
+-+-+-+-+-+-+-+-+-+-+-+-+-+-+-+-+-+-+-+-+-+-+-+-+-+-+-+-+-+-+-+-+
|                    Event Sequence Number                      |
+-+-+-+-+-+-+-+-+-+-+-+-+-+-+-+-+-+-+-+-+-+-+-+-+-+-+-+-+-+-+-+-+
|R|x|x|x|x|x|x|x|   Duration    |   Function    | X-Function    |
+-+-+-+-+-+-+-+-+-+-+-+-+-+-+-+-+-+-+-+-+-+-+-+-+-+-+-+-+-+-+-+-+
|          Event Flags          |       Flow Control Flags      |
+-+-+-+-+-+-+-+-+-+-+-+-+-+-+-+-+-+-+-+-+-+-+-+-+-+-+-+-+-+-+-+-+
|x|x|x|x|x|x|x|x| Message Type  |   Tech Type   | Block Length  |
+-+-+-+-+-+-+-+-+-+-+-+-+-+-+-+-+-+-+-+-+-+-+-+-+-+-+-+-+-+-+-+-+ ----------
|            # of TLVs          | Extension Block length (bytes)| |
+-+-+-+-+-+-+-+-+-+-+-+-+-+-+-+-+-+-+-+-+-+-+-+-+-+-+-+-+-+-+-+-+ |
|           Type1               |           Length1             | |
+-+-+-+-+-+-+-+-+-+-+-+-+-+-+-+-+-+-+-+-+-+-+-+-+-+-+-+-+-+-+-+-+ |
~                        Value1                                 ~ Extension Value
+-+-+-+-+-+-+-+-+-+-+-+-+-+-+-+-+-+-+-+-+-+-+-+-+-+-+-+-+-+-+-+-+ |
|           Type2               |           Length2             | |
+-+-+-+-+-+-+-+-+-+-+-+-+-+-+-+-+-+-+-+-+-+-+-+-+-+-+-+-+-+-+-+-+ |
~                        Value2                                 ~ |
+-+-+-+-+-+-+-+-+-+-+-+-+-+-+-+-+-+-+-+-+-+-+-+-+-+-+-+-+-+-+-+-+ ----------
```

FIG. 12

METHOD, DEVICE AND SYSTEM FOR MANAGING RESOURCES IN NETWORKS

CROSS-REFERENCE TO RELATED APPLICATIONS

This application is a continuation of International Application No. PCT/CN2009/070100, filed on Jan. 12, 2009, which claims priority to Chinese Patent Application No. 200810065194.8, filed on Jan. 11, 2008, both of which are hereby incorporated by reference in their entireties.

FIELD OF THE TECHNOLOGY

The present invention relates to the field of data communications, and more particularly to a method, device and system for managing resources in networks.

BACKGROUND OF THE INVENTION

The IPTV video is a high bandwidth consumption service, and packet loss is not allowed, while a network bandwidth, particularly a user link bandwidth is generally very limited. To guarantee effective launch of a video service and guarantee quality of service (QoS), a resource manager (RM) and a connection admission control (CAC) function are required to deploy in a network.

Both multicast/broadcast video (such as BTV) service and unicast video (such as VOD) service are included in an IPTV service. Because a mode of a multicast service and a mode of a unicast service differ greatly, CAC function implementations of the two modes are also different.

The multicast CAC is generally completed locally at an access node (AN). The AN judges whether the user link bandwidth satisfies a bandwidth requirement for requesting to join in a channel, or judges whether a count of channels that a user joins in is beyond a limited maximal quantity. If the CAC is failed (bandwidth insufficient or beyond the maximal quantity), a channel join request of the user is denied.

The unicast CAC function is generally completed by an independent RM. The RM appreciates the network topology, and manages an end-to-end bandwidth from a unicast video server to the user. Therefore, when the user requests a unicast video service, a service server can request resources from the RM. The RM judges the satisfaction of the end-to-end bandwidth, and returns a result of requesting resources. The service server decides whether to admit a service according to the result of requesting resources.

In an existing solution, resources are reserved for the multicast service and the unicast service each on a user link, and are not occupied by each other. The AN implements a local multicast CAC function, and the RM completes an end-to-end CAC function from the unicast video server to the user. The unicast CAC function and the multicast CAC function of the solution are independent of each other, and keep consistent with the existing network. However, the multicast service and the unicast service are not able to share bandwidth resources and thus resulting in waste of the bandwidth resources. Moreover, the solution has a limited application scenario, that is, the solution is only suitable for a scenario of a sufficient user link bandwidth.

In another existing solution, when the user joins in a certain channel, the AN proactively reports information of the channel that the user joins in, directly sends the information to the RM or sends the information to the RM through a broadband network gateway (BNG), and the RM judges whether the user link bandwidth satisfies the requirement. If the requirement is not satisfied, the AN is notified to reject a user join request.

Such processes for the AN to report multicast user join information, and for the RM to perform the CAC in a unified way unifies the implementation of the multicast and implementation of the unicast. However, realization of the solution is complex, and the switching frequency of the multicast service is higher than the switching frequency of the unicast service. The case that a large number of TV users frequently switching channels will result in a great deal of information interaction, which imposes a very high requirement on the performance of the AN. Furthermore, the channel switching of the multicast service is required to interact with the RM, the switching time is long, and thus the user experience is poor.

SUMMARY OF THE INVENTION

Accordingly, the present invention is directed to a method, device and system for managing resources in networks.

According to one aspect, the present invention provides a method for managing resources in networks, which includes the following steps.

A resource manager (RM) sends a first request message according to a received resource request message, to a network access server (NAS), so that the NAS requests an access node (AN) to perform admission control; and sends a response message of the resource request message after receiving an admission control from the NAS result indicating whether a resource requested by the resource request message is admitted.

According to another aspect, the present invention further provides a method for managing resources in networks, which includes the following steps.

A network access server (NAS) performs ANCP protocol conversion on a first request message received from a resource manager (RM); sends the converted ANCP message to an access node (AN) to request the AN to perform admission control; and returns the admission control result to the RM after receiving an admission control result sent by the AN indicating whether a resource requested by the resource request message is admitted.

Further according to another aspect, the present invention further provides a communications system, which includes a resource manager (RM), an access node (AN), and a network access server (NAS).

The RM is configured to send the NAS a first request message according to a received resource request message, to request the AN to perform admission control; and send a response message of the resource request message after receiving an admission control result sent by the NAS indicating whether a resource requested by the resource request message is admitted.

The NAS is configured to perform ANCP protocol conversion on the first request message sent by the RM; send the converted ANCP message to the AN to request the AN to perform the admission control; and send the admission control result to the RM after receiving the admission control result returned by the AN indicating whether the resource requested by the resource request message is admitted.

The AN is configured to perform the admission control according to the ANCP message from the NAS requesting to perform the admission control; and return the admission control result indicating whether the resource requested by the resource request message is admitted to the NAS.

With the embodiments of the present invention, when an error occurs, the AN optionally delivers the error to a broadband remote access server (BRAS), the BRAS optionally reports the error to a resource and admission control subsystem (RACS), the RACS reports the error to an IPTV Server, and the Server notifies a user. Therefore, When multicast/unicast connection admission control (CAC) supporting shared bandwidth is realized, processes for configuring user lines between the AN and BRAS are converged, and processes for distributing policies between the RACS and BRAS are converged.

BRIEF DESCRIPTION OF THE DRAWINGS

The patent or application file contains at least one drawing executed in color. Copies of this patent or patent application publication with color drawing(s) will be provided by the Office upon request and payment of the necessary fee. To make the technical solution under the present invention clearer, the accompanying drawings for illustrating the embodiments of the present invention or the prior art are outlined below. Apparently, the accompanying drawings are for the exemplary purpose only, and person having ordinary skill in the art can derive other drawings from such accompanying drawings without any creative effort.

FIG. 8 is a schematic diagram of the line configuration message format according to an embodiment of the present invention;

FIG. 9 is a schematic diagram of the line configuration message according to an embodiment of the present invention;

FIG. 10 is a schematic diagram of the line configuration result message according to an embodiment of the present invention;

FIG. 11 is a schematic structural view of Capability negotiation according to an embodiment of the present invention;

FIG. 12 is a schematic structural view of the VOD Access Control Extensions according to an embodiment of the present invention;

DETAILED DESCRIPTION OF THE EMBODIMENTS

The technical solution of the present invention is hereinafter described in detail with reference to the accompanying drawings. It is evident that the embodiments are only exemplary embodiments of the present invention and the present invention is not limited to such embodiments. Those skilled in the art can derive other embodiments from the embodiments given herein without creative work, and all such embodiments are covered in the scope of protection of the present invention.

Figure 1:
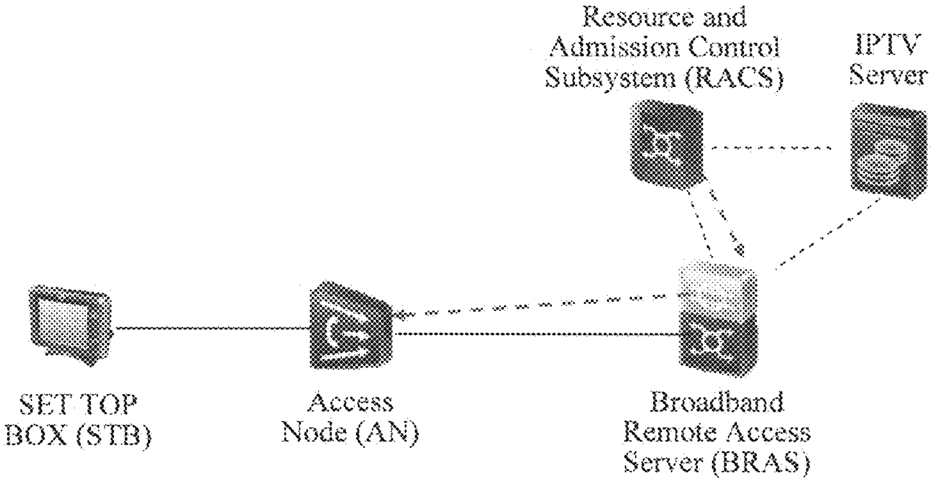
FIG. 1 is a schematic diagram of an admission control system according to an embodiment of the present invention.

In embodiments, the present invention mainly utilizes an access node (AN) to perform admission control for an access section including multicast and unicast services. The multicast admission control and control execution are completed by the AN. As shown in FIG. 1, the unicast admission control is completed by the AN and a resource and admission control subsystem (RACS). The control execution is performed by the AN and a broadband remote access server (BRAS). The BRAS acts as a medium between the RACS and the AN. The RACS and an IPTV Server (the IPTV SERVER can include a VOD service server for the unicast and a video server for a multicast stream. If it is the VOD service, the IPTV SERVER can be referred as a VOD server.) interact an admission control message. The RACS requests resources from the BRAS with such protocols as COPS, Diameter, and H.248. The BRAS requests resources from the AN with such protocols as access node control protocol (ANCP) and Diameter. A VOD data stream from AN on demand is transmitted through the VOD server to a convergence network to the BRAS and then to the AN. The BRAS mentioned in the present specification can all be a broadband network gateway (BNG). The RACS mentioned in the present specification can also be a policy server or another resource manager (RM) which is able to realize an RACS function in the present invention. The BRAS can also be another network access server (NAS) which is able to realize a BRAS function in the present invention.

In an embodiment, the present invention provides a method for managing resources in networks, which includes the following steps. An RM sends a first request message according to a received resource request message, to request the AN to perform admission control; and sends a response message of the resource request message after receiving an admission control result indicating whether a resource requested by the resource request message is admitted.

In detail, the RM sends to an NAS the first request message according to the received resource request message, to request the AN to perform the admission control; and sends the response message of the resource request message after receiving the admission control result sent by the NAS indicating whether the resource requested by the resource request message is admitted.

In an embodiment, the present invention further provides a method for managing resources in networks, which includes the following steps. The NAS performs protocol conversion on the received first request message from the RM; sends the converted message to the AN to request the AN to perform the admission control; and requested by the resource request message is admitted returns the admission control result to the RM after receiving the admission control result sent by the AN indicating whether the resource requested by the resource request message is admitted.

In an embodiment, the present invention further provides a method for managing resources in networks, which includes the following steps. The AN performs the admission control according to a received request for the admission control from network access server NAS, and returns the admission control result indicating whether the resource requested by the resource request message is admitted to the NAS. The request for the admission control requests to perform reservation or release of a resource (such as bandwidth) on the AN.

Figure 2:
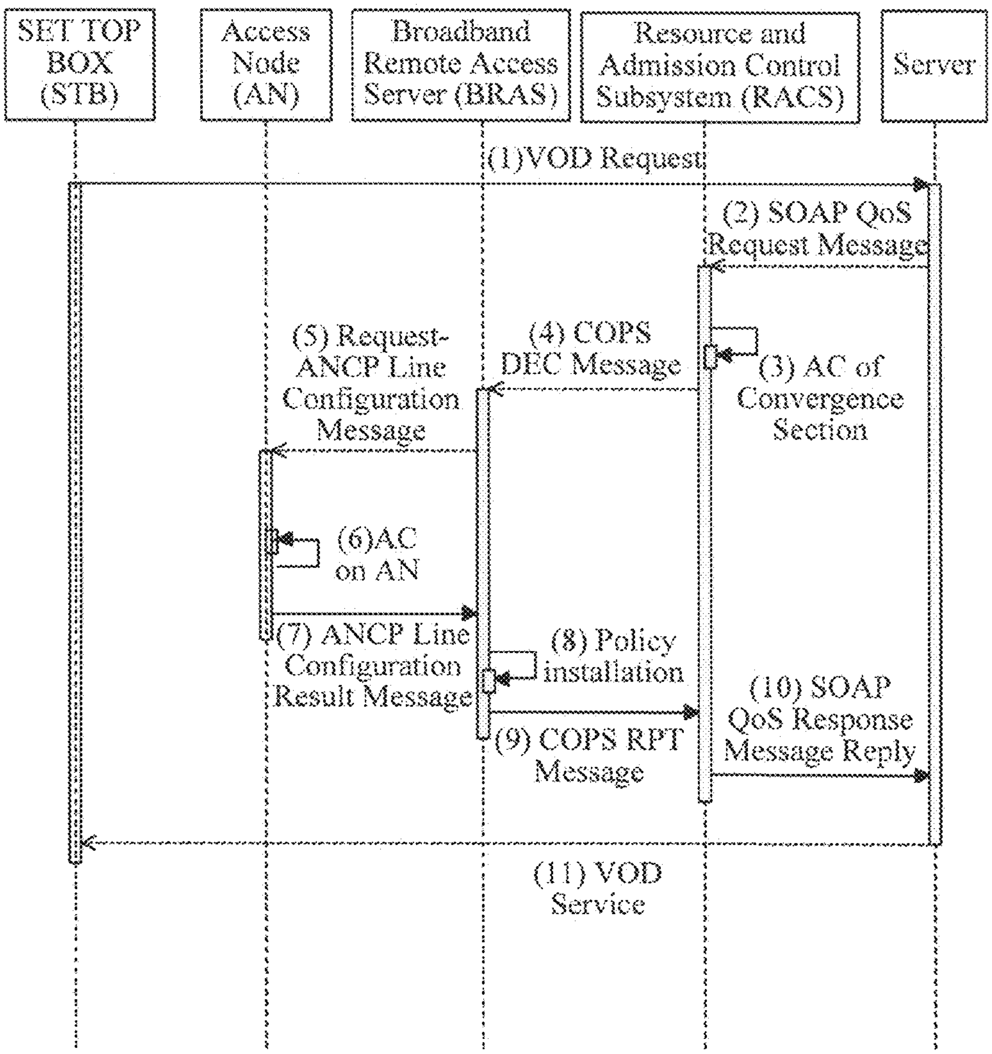
FIG. 2 is an interaction flow chart of a first admission control of starting the VOD service according to an embodiment of the present invention.

The following is illustrated in detail by taking the admission control of the VOD service as an example, in which, the IPTV Server is a VOD Server. As shown in FIG. 2, an interaction process of the first admission control of starting the VOD service is described as follows:

1) A SET TOP BOX (STB) initiates a VOD request to the VOD Server.

2) The VOD server sends an SOAP QoS request to the RACS, and the request message includes a user ID and a program bandwidth.

3) The RACS performs connection admission control (CAC) of a convergence section.

4) The RACS sends a COPS decision (DEC) message (if using a COPS protocol) to the BRAS, and the message includes the user ID, the program bandwidth, and a policy to be installed by the BRAS.

5) The BRAS sends an ANCP line configuration message (if using an ANCP protocol) to the AN, and the message includes a line ID and the program bandwidth. The request message of the CAC is carried by means of the ANCP line configuration message.

6) The AN performs the CAC of an access section.

7) The AN returns an ANCP line configuration result message to the BRAS, and the message includes a result code.

8) The BRAS installs the policy.

9) The BRAS returns a result to the RACS. If the COPS protocol is used, a COPS report (RPT) message can be used.

10) The RACS returns an SOAP QoS response message to the VOD server, and the message includes the result.

11) The VOD server transfers the VOD service to the STB.

Figure 3:
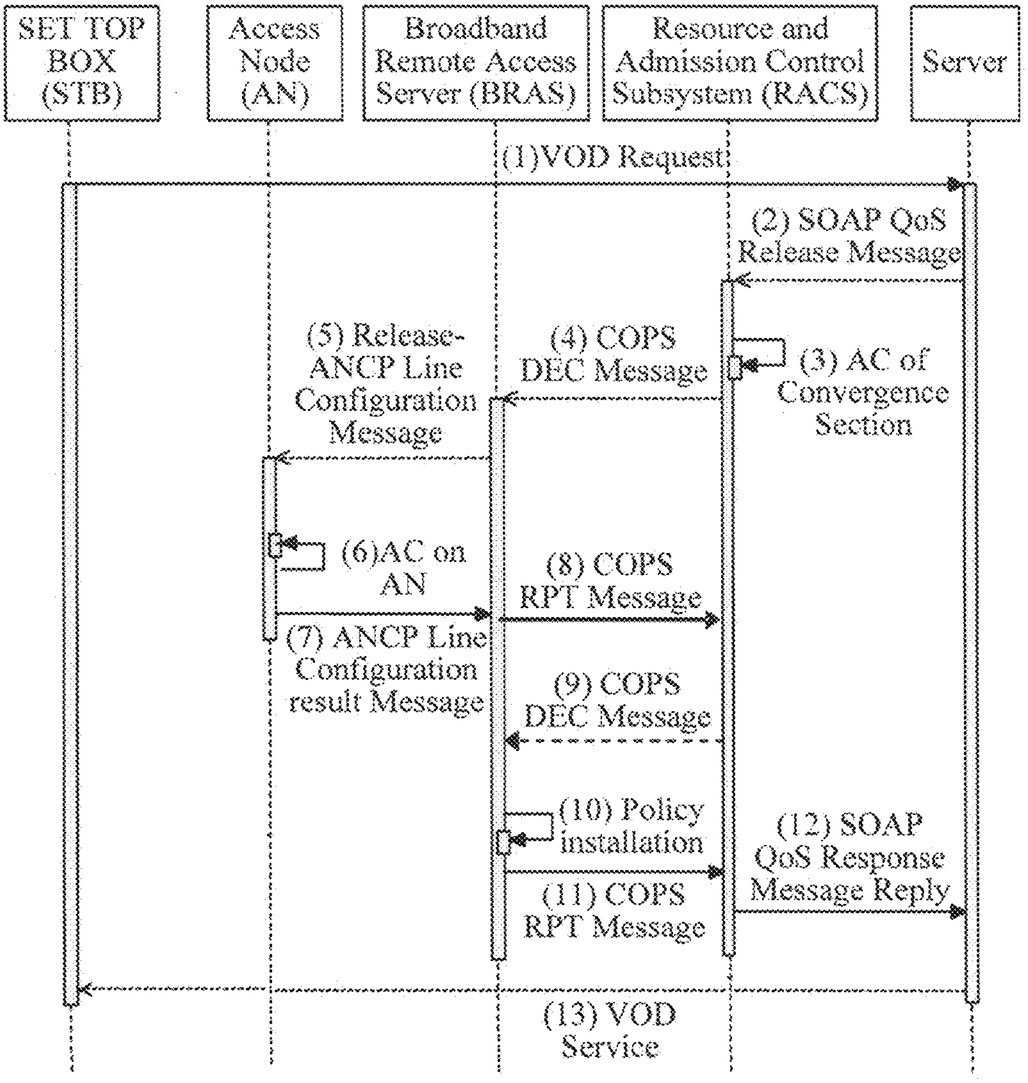
FIG. 3 is an interaction flow chart of a second admission control of starting the VOD service according to an embodiment of the present invention.

As shown in FIG. 3, an interaction process of the second admission control of starting the VOD service is described as follows:

1) The STB initiates the VOD request to the VOD server.

2) The VOD server sends the SOAP QoS request to the RACS, and the request message includes the user ID and the program bandwidth.

3) The RACS performs the CAC of the convergence section.

4) The RACS sends the COPS DEC message (if using the COPS protocol) to the BRAS, and the message includes the user ID and the program bandwidth.

5) The BRAS sends the ANCP line configuration message (if using the ANCP protocol) to the AN, and the message includes the line ID and the program bandwidth. The request message of the CAC is carried by means of the ANCP line configuration message.

6) The AN performs the CAC of the access section.

7) The AN returns the ANCP line configuration result message to the BRAS, and the message includes the result code.

8) The BRAS returns an ANCP line configuration result to the RACS. If the COPS protocol is used, the COPS RPT message can be used.

9) The RACS sends the COPS DEC message (if using the COPS protocol) to the BRAS, and the message includes the policy to be installed by the BRAS.

10) The BRAS installs the policy.

11) The BRAS returns a result of installing the policy to the RACS. If the COPS protocol is used, the COPS RPT message can be used.

12) The RACS returns the SOAP QoS response message to the VOD server, and the message includes the result.

13) The VOD server transfers the VOD service to the STB.

Persons skilled in the art can see that, the processes described in the two embodiments are successful processes of the unicast admission control. If the CAC of the convergence section or the CAC of the access section or the installation of the policy by the BRAS is not successful, the unicast admission control is failed.

In step (3), performing the CAC of the convergence section by the RACS mainly refers to performing availability detection on the bandwidth of the convergence section and performing resource reservation after passing the availability detection, and the step is an optional step.

In step (5), the BRAS determines the line ID according to the user ID in the COPS DEC message sent by the RACS, and the line ID is carried in the ANCP line configuration message sent to the AN.

In step (6), performing the CAC of the access section by the AN mainly refers to performing availability detection on the bandwidth of the access section and performing resource reservation after passing the availability detection.

In step (7), the AN returns the ANCP line configuration result message to the BRAS, and the message includes the result code; if the result is successful admission, it indicates that the unicast resource requested by the resource request message is admitted; and if the result is failure, it indicates that the unicast resource request is rejected. The AN can further send a result of the CAC of the access section to the BRAS with other communications protocols.

Further, in the interaction process of the first admission control of starting the VOD service:

step (8) of installing the policy by the BRAS is optional.

It can be further prescribed that the sending, by the RACS, the COPS DEC message to the BRAS in step (4) is not performed until the CAC of the convergence section is successful; and the policy installation in the step (8) is not performed until the BRAS received a message returned by the AN indicating that the CAC of the access section is successful.

In the interaction process of the second admission control of the VOD service beginning on demand:

Step (9), step (10) and step (11), that is, the process of installing the policy by the BRAS is optional.

It can be further prescribed that the sending, by the RACS, the COPS DEC message to the BRAS in the step (4) is not performed until the CAC of the convergence section is successful; and the step (9) that the RACS sends to the BRAS the COPS DEC message carrying the policy to be installed by the BRAS is not performed until the BRAS received the message returned by the AN indicating that the CAC of the access section is successful.

The present invention further provides a method in which the AN and the RACS commonly complete the admission control of unicast service stopping on demand.

Figure 4:
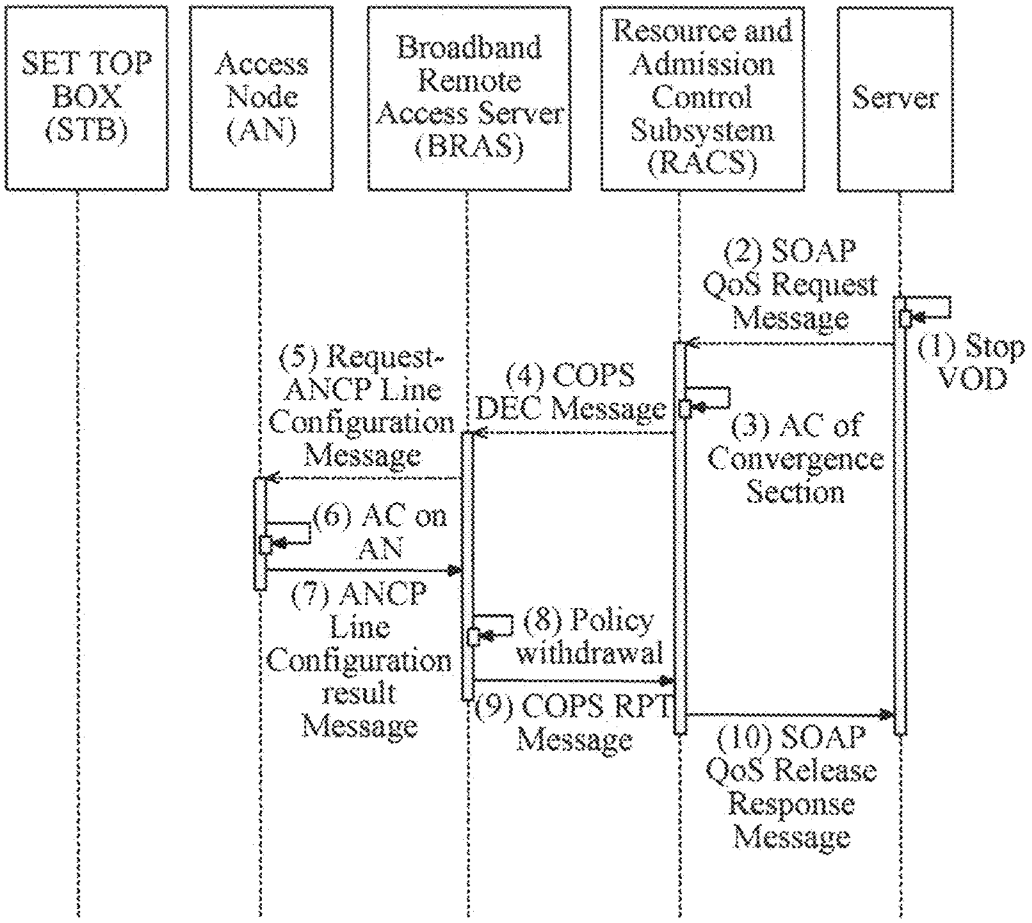
FIG. 4 is an interaction flow chart of a first admission control of stopping the VOD service according to an embodiment of the present invention.

As shown in FIG. 4, an interaction process of the first admission control of stopping the VOD service is described as follows:

(1) The Server stops the VOD service.

(2) The Server sends an SOAP QoS release message to the RACS.

(3) The RACS completes the CAC of the convergence section.

(4) The RACS sends to the BRAS the COPS DEC message requesting to release the bandwidth, and the user ID and the program bandwidth are included in the message.

(5) The BRAS sends the ANCP line configuration message (if using the ANCP protocol) to the AN, and the message includes the line ID and the program bandwidth. This request message of the CAC is carried by means of the ANCP line configuration message.

(6) The AN performs the CAC of the access section.

(7) The AN sends to the BRAS the ANCP line configuration result message including the result code.

(8) The BRAS withdraws the policy. The step (8) can also be performed after the step (4) and before the step (5).

(9) The BRAS sends to the RACS the COPS RPT message, and sends the result.

(10) The RACS sends to the Server an SOAP QoS release response message including the result.

Figure 5:
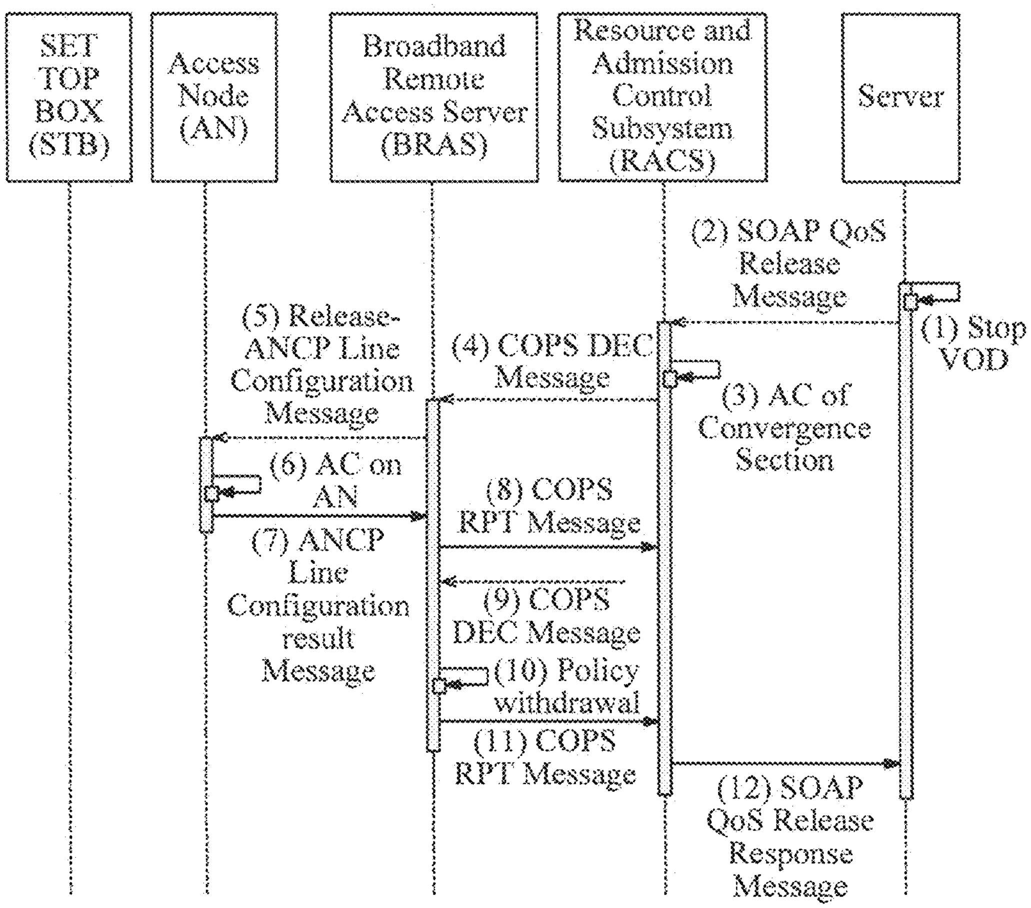
FIG. 5 is an interaction flow chart of a second admission control of stopping the VOD service according to an embodiment of the present invention.

As shown in FIG. 5, an interaction process of the second admission control of stopping the VOD service is described as follows:

(1) The Server stops the VOD service.

(2) The Server sends the SOAP QoS release message to the RACS.

(3) The RACS completes the CAC of the convergence section.

(4) The RACS sends to the BRAS the COPS DEC message requesting to release the bandwidth, and the message includes the user ID and the program bandwidth.

(5) The BRAS sends the ANCP line configuration message (if using the ANCP protocol) to the AN, and the message includes the user ID and the program bandwidth.

(6) The AN performs the CAC.

(7) The AN sends to the BRAS the ANCP line configuration result message, the message includes the result code.

(8) The BRAS sends to the RACS the COPS RPT message, and sends the ANCP line configuration result.

(9) The RACS sends COPS DEC message to the BRAS to withdraw the policy.

(10) The BRAS withdraws the policy.

(11) The BRAS sends to the RACS the COPS RPT message, and sends a result of withdrawing the policy by the BRAS.

(12) The RACS sends to the Server the SOAP QoS release response message including the result.

In the process of the admission control of the stop on demand, the CAC of the convergence section mainly refers to releasing the bandwidth of the convergence section; the CAC of the access section mainly refers to releasing the bandwidth of the access section; and in step (7), the AN can send a result of releasing the bandwidth of the access section to the BRAS with other communications protocols.

Further, in the interaction process of the first admission control of stopping the VOD service, step (8) of withdrawing the policy by the BRAS is optional; and likewise, in the interaction process of the second admission control of stopping the VOD service, steps (9), (10), and (11), that is, the process of withdrawing the policy by the BRAS is optional.

Figure 6:
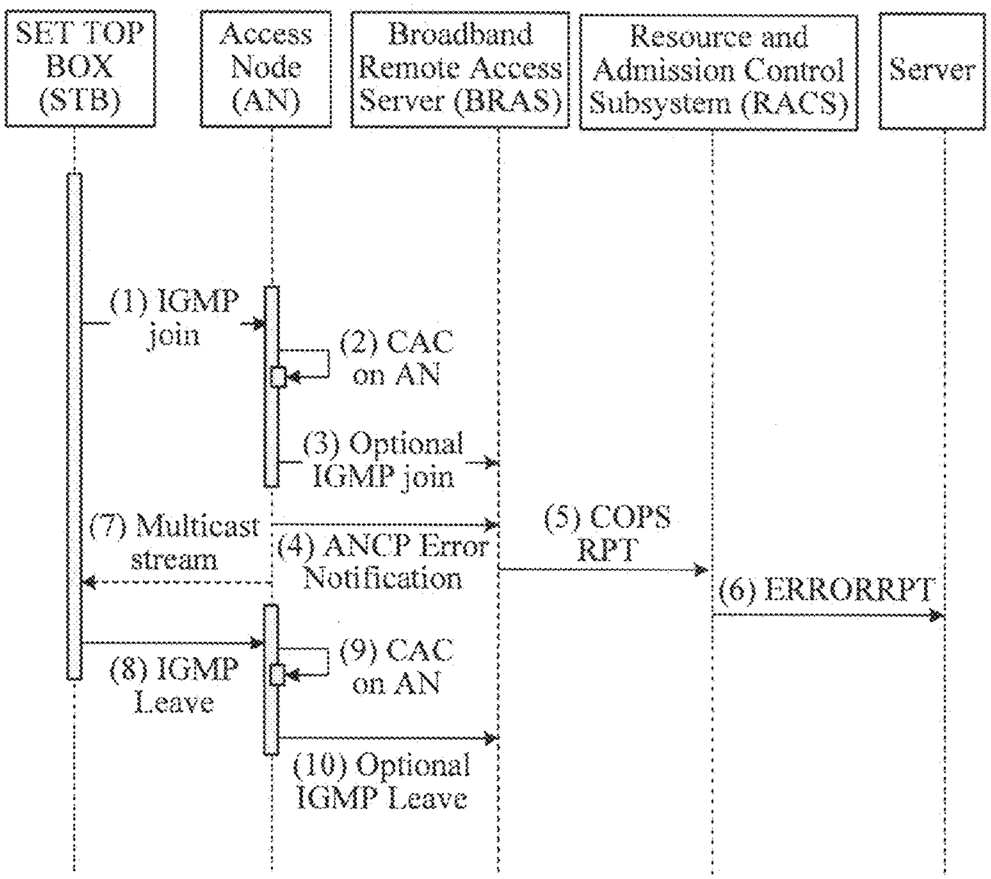
FIG. 6 is an interaction flow chart of the admission control of the multicast TV service according to an embodiment of the present invention.

The following is illustrated in detail by taking the admission control of the multicast TV service as another example. As shown in FIG. 6, an interaction process of the admission control for the multicast TV service is described as follows:

(1) The STB sends IGMP Join to the AN, and joins in a multicast group.

(2) The AN performs the CAC of the access section.

(3) Optionally, the AN sends the IGMP Join to the BRAS.

(4) If the AN detects an error, an ANCP error notification is sent to the BRAS (if the ANCP protocol is used).

(5) The BRAS sends the COPS RPT to the RACS (if the COPS protocol is used) to report the error.

(6) Optionally, the RACS reports the error to the Server.

(7) The AN transfers the multicast stream to the STB.

(8) When a user stops watching a program, the STB sends IGMP Leave to the AN and leaves the multicast group.

(9) The AN performs the CAC of the access section and releases the resource.

(10) Optionally, the AN sends the IGMP Leave to the BRAS.

Persons skilled in the art can see that, in a process of the admission control of the multicast TV service, if the AN does not detect the error, after step (2) or (3), steps (7) to (10) are performed; and if the AN detects the error, the process ends at step (6).

By the embodiment, when an error occurs, the AN reports the error. After the IPTV Server knows this error, the user can be notified by displaying the error on the STB, so that the user is able to know the error which occurs, thus avoiding the dark screen phenomenon at the time when the error occurs, and improving the user experience.

The interaction between the BRAS and the AN is illustrated in the following by taking the ANCP protocol as an example.

Figure 7:
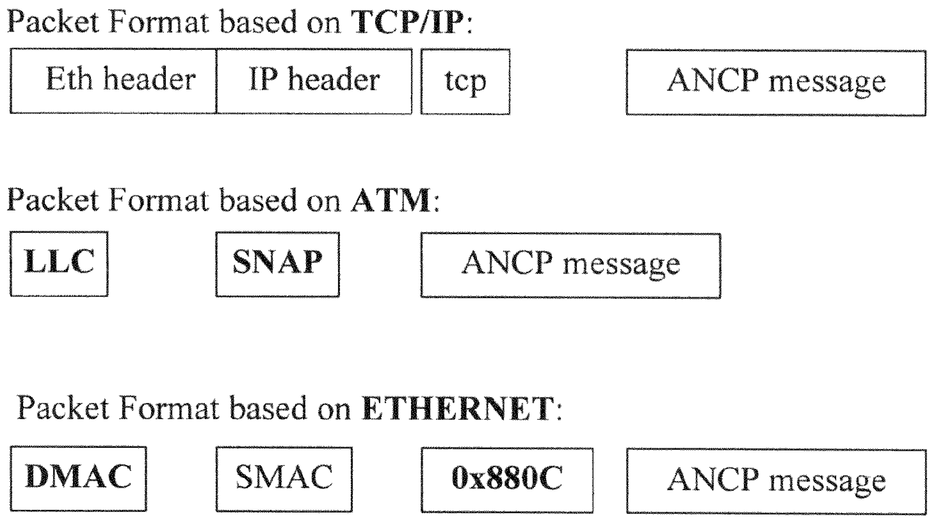
FIG. 7 is a schematic diagram of the ANCP packet format used in an embodiment of the present invention.

A format of the ANCP line configuration message is shown in FIG. 7.

A field of the ANCP message is modified according to a GSMPv3 message of the <<draft-ietf-ancp-protocol-01.txt>>. Parameters of the message include the line ID, the program bandwidth, and a result reply.

Two solutions for performing extension on the ANCP protocol are described in the following.

In the first solution, the extension is performed with the format of the line configuration message, and the format of the line configuration message is shown in FIG. 8.

Parameters of the line configuration message:

Line ID (Access-Loop-Circuit-ID)

Length of a line identifier CID is 63 bytes (a Type field in a TLV block is set to 0x01; and a value field is an ASCII string with length up to 63 bytes. A default format of the string (which is configurable) is:

Access-Node-Identifier eth slot/port[:vlan-id] for VDSL PTM port

Access-Node-Identifier atm slot/port:vpi.vci for ATM port.)

For TI scenarios, the CID format should be configured to: Access-Node-Identifier eth slot/port[:vlan-id][:user802.1p] for VDSL PTM port Program Bandwidth (Service-Profile-Name)

Program bandwidth: 4000000 bps, an RACS request bandwidth, or −4000000 bps, an RACS release bandwidth (the Type field in the TLV block is set to 0x06; and the value field is a program bandwidth (bps) in an ASCII string format: 4000000, means the RACS request bandwidth −4000000, means the RACS release bandwidth)

Program Bandwidth (Service-Profile-Name) (another extension method 1)

Program name (the Type field in the TLV block is set to 0x06; and the value field is a program name denoted in the ASCII string format:

ASCII string containing the program name)

Program Bandwidth (Service-Profile-Name)(another extension method 2)

Program identifier (the Type field in the TLV block is set to 0x06; and the value field is a program ID (32 bit integers): program ID (32 bit integers).)

Result Code of Bandwidth Application

A result field of the line configuration message is set to be successful or failed, and a code field is set to 0.

FIG. 9 shows a detailed example of the line configuration message, and FIG. 10 shows a detailed example of the line configuration result message.

In the second solution, a new ANCP application scenario is added, that is, an admission control system application scenario based on the ANCP is defined. The definition of the new application scenario includes the following parts: definition of Capability negotiation, definition of VOD Access Control Extensions, and setting of supporting Bulk Transaction, which make multiple VOD Access Control result messages to be bound in one message and to be reported to the BRAS or the RACS. That is to say, when detecting an error which occurs, the AN can use the message to report the error.

FIG. 11 shows a detailed definition manner of Capability negotiation, in which it is needed to add VOD access control capability=0x5.

FIG. 12 shows a detailed definition manner of the VOD Access Control Extensions, which adopts a Message Type of line configuration, adds a new function value indicating VOD Access Control, and an Extension Value defines parameters required by the VOD Access Control.

Line 1ID (Access-Loop-Circuit-ID)

The length of the line identifier is 63 bytes (the Type field in the TLV block is set to 0x01; and the value field is the ASCII string with length up to 63 bytes. The default format of the string (which is configurable) is:

Access-Node-Identifier eth slot/port[:vlan-id] for VDSL PTM port

Access-Node-Identifier atm slot/port:vpi.vci for ATM port.)

It should be noted that: a CID form should be configured to be

Access-Node-Identifier eth slot/port[:vlan-id][:user802.1p] for VDSL PTM port

Program Bandwidth (Service-Profile-Name)

Program bandwidth: 4000000 bps, RACS request bandwidth allocation; −4000000 bps, RACS release bandwidth (the Type field in the TLV block is set to 0x06; and the value field is a program bandwidth (bps) in an ASCII string format:

4000000, means the RACS request bandwidth

−4000000, means the RACS release bandwidth)

Program Bandwidth (Service-Profile-Name)(another extension method 1)

Program name (the Type field in the TLV block is set to 0x06; and the value field is a program name denoted in the ASCII string format:

ASCII string containing the program name)

Program Bandwidth (Service-Profile-Name)(another extension method 2)

Program identifier (the Type field in the TLV block is set to 0x06; and the value field is a program ID (32 bit integers):

program ID (32 bit integers).)

Result Code of Bandwidth Application

A result field of the admission control message is set to be successful or failed, and a code field is set to 0.

The interaction between the IPTV Server and the RACS is illustrated in the following by taking the SOAP protocol as an example. A QoS request message, a QoS response message, a QoS release message, and a QoS release response message exist between the IPTV Server and the RACS. The QoS request message from the server to the RACS is used to request the program bandwidth. The QoS response message from the RACS to the server is used to response an AAR message. The QoS release message from the server to the RACS is used to release the program bandwidth. The QoS release response message from the RACS to the server is used to response the QoS release message.

The format of the QoS request message is described in the following:

```
<SvcX: AARMessage >
< MsgType >
< SessionId>
< ApplicationId>
< MaxBandwidthUL>
< MaxBandwidthDL>
< FlowCount>
< MediaInfos>
<MediaType>
<FlowDirection>
<MaxBandwidth>
<SrcIp>
<DestIp>
<SrcBeginPort>
<SrcEndPort>
<DestBeginPort>
<DestEndPort>
<ProtocolType>
</MediaInfos>
......
<UsrLocation>
</SvcX: AARMessage >
```

SessionId: this element is used to identify a VOD session.

MediaInfos: the RACS supports eight MediaInfos at most. At least one MediaInfo is provided.

Program bandwidth: for each direction, the program bandwidth is a sum of the MaxBandwidth of all the MediaInfos.

User ID: the Srclp in the upstream MediaInfo and the Dstlp in the downstream MediaInfo are used to identify the user.

The format of the QoS request response message is described in the following:

```
<SvcX: AAAMessage >
  < MsgType >
< SessionId>
< ResultCode>
</SvcX: AAAMessage >
```

The format of the QoS release message is described in the following:

```
<SvcX:STRMessage >
  < MsgType >
< SessionId>
</SvcX:STRMessage >
```

The format of the QoS release response message is described in the following:

```
<SvcX: STAMessage >
  < MsgType >
< SessionId>
< ResultCode>
</SvcX: STAMessage >
```

The interaction between the RACS and the BRAS is illustrated in the following by taking the COPS protocol as an example. Two types of message (DEC Message and RPT Message) exist between the RACS and the BRAS.

The DEC message from the RACS to the BRAS is used to request or release the program bandwidth.

The state RPT message from the BRAS to the RACS is used to communicate whether the request or release of the program bandwidth is successful or failed.

The format of the DEC message is described in the following:

```
<Decision Message> ::= <Common Header>
                        <Client Handle>
                        *(<Decision>) | <Error>
                        [<Integrity>]
 <Decision> ::= <Context>
                <Decision: Flags>
                [<Named Decision Data: Provisioning >]
<Named Decision Data> ::= <<Install Decision>|
                            <Remove Decision>>
<Install Decision>     ::= *(<PRID> <EPD>)
<Remove Decision>      ::= *(<PRID>|<PPRID>)
EPD: ssgANCtrlTable
ssgANCtrlTable contains one entry: ssgANCtrlEntry.
ssgANCtrlEntry ::= SEQUENCE {
        ssgANCtrlType              INTEGER
        ssgANCtrlUpBandwidth          Unsigned32
        ssgANCtrlDownBandwidth        Unsigned32
}
```

User ID: the user ID is not an actual parameter in the DEC message. The BRAS uses the Client-Handle as a key word to find out user information including the line ID, and then transfers the line ID to the AN.

Operation type: The ssgANCtrlType in the DEC message is used to denote the operation type.

1: refers to requesting bandwidth.

2: refers to releasing bandwidth.

Program bandwidth: the program bandwidth is denoted by the ssgANCtrlUpBandwidth (uplink bandwidth) and the ssgANCtrlDownBandwidth (downlink bandwidth).

The format of the RPT message is described in the following:

```
<Report State> ::= <Common Header>
                   <Client Handle>
                   <Report Type>
                   *(<Named ClientSI>)
                   [<Integrity>]
```

For Success and Failure Report-Type Data Format:

```
<Named ClientSI: Success and Failure Report>::=
<[<GPERR>] *(<report>)>
 <report>::= <ErrorPRID> <CPERR> *(<PRID><EPD>)
```

in which,

Result: The result is denoted by the Report-Type object:

1=Success: DEC is executed by the BRAS successfully.

2=Failure: The DEC cannot be executed by the BRAS successfully.

Error Code: if the result is failure, the detailed Error Code is denoted by a CPERR object.

In an embodiment, the present invention further provides a communications system, which includes an RM, an AN, and an NAS. The system can further include a service server, such as an IPTV Server, and can further include user side equipment, such as an STB. As shown in FIG. 1, the RM can be an RACS; and the NAS can be a BRAS.

The RM receives the resource request message sent by the service server, and sends to the NAS the first request message to request the AN to perform the admission control; and sends the response message of the resource request message to the service server, after receiving the admission control result sent by the NAS indicating whether the resource requested by the resource request message is admitted. The NAS is configured to perform the protocol conversion on the first request message sent by the RM; send the converted message to the AN to request the AN to perform the admission control; and send the admission control result to the RM after receiving the admission control result returned by the AN indicating whether the resource requested by the resource request message is admitted. The AN is configured to perform the admission control according to the message from the NAS requesting to perform the admission control; and return the admission control result indicating whether the resource requested by the resource request message is admitted to the NAS.

The NAS is further configured to install and withdraw a policy. In detail, after receiving the admission control result returned by the AN and sending the result to the RM, the NAS receives the message carrying the policy to be installed sent by the RM, performs the policy installation according to the policy to be installed, and sends the policy installation result to the RM. Alternatively, the NAS is further configured to install the policy after receiving the admission control result returned by the AN according to the policy to be installed carried in the first request message sent by the RM, and send the admission control result and the policy installation result to the RM.

Correspondingly, the NAS is further configured to receive a policy withdrawal message sent by the RM after receiving the admission control result returned by the AN and sending the admission control result to the RM, withdraw the policy according to the message, and send the result of withdrawing the policy to the RM. Alternatively, the NAS is further configured to withdraw the policy after receiving the admission control result returned by the AN according to the first request message sent by the RM, and send the admission control result and the result of withdrawing the policy to the RM.

The NAS is further configured to convert the error notification message reported by the AN into a protocol format which the RM is able to identify, and send it to the RM. After receiving the error notification message, the RM can report the message to the service server, so that the service server displays the error message on the STB to notify the user of the error which currently occurs.

In detail, the first request message can be a DEC message of the COPS protocol, or a corresponding message of other protocols which can realize the same function. The communications system provided according to the embodiment is able to realize multicast/unicast CAC sharing the bandwidth on the AN, and flow fusions of user line configuration between the AN and the BRAS and policy distribution between the RACS and the BRAS are guaranteed. Additionally, communication can be performed between the AN and the RACS through the BRAS in the system, so that network deployment and configuration are simpler. Because the multicast/unicast CAC sharing the bandwidth is realized on the AN, the resource waste in the presence of independent multicast and unicast resources can be avoided. The AN reconstruction cost for controlling the AN by the BRAS is small, so that reconstruction expenses of the whole network can be saved, and the cost can be reduced. Furthermore, when the error occurs, the system is able to timely report error information, and notifies the current error to the user, thus improving the user experience.

Figure 13:
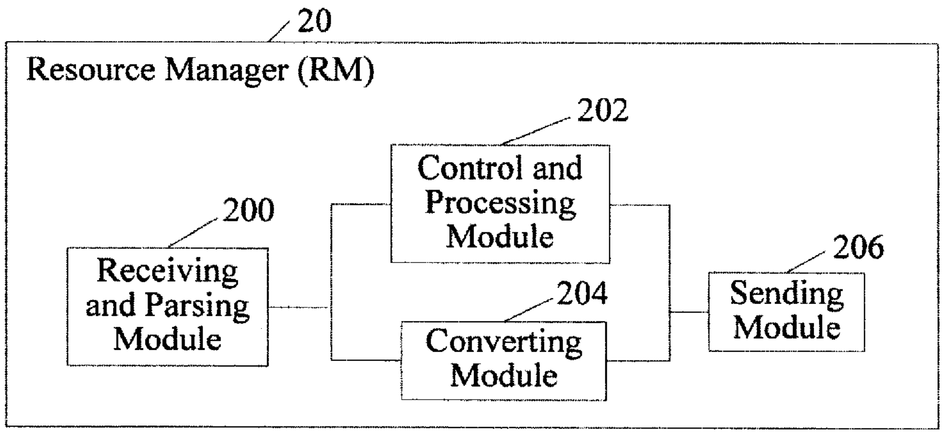
FIG. 13 is a schematic structural view of a resource manager (RM) according to an embodiment of the present invention.

In an embodiment, the present invention further provides an RM. In detail, the RM can be an RACS or a policy server. As shown in FIG. 13, the RM 20 includes a receiving and parsing module 200, a control and processing module 202, a converting module 204, and a sending module 206.

The receiving and parsing module 200 is configured to forward the resource request message to the control and processing module 202 when the resource request message is received; and forward the admission control result sent by the NAS indicating whether the resource requested by the resource request message is admitted to the converting module 204 when the result is received. The control and processing module 202 is configured to send the sending module 206 the first request message according to the received resource request message, to request the AN to perform the admission control. The user ID and the program bandwidth are included in the first request message. The converting module 204 is configured to send the response message of the resource request message to the sending module 206 according to the received admission control result. The sending module 206 is configured to send out the response message of the resource request message; and send the first request message to the NAS.

The receiving and parsing module 200 is further configured to forward the resource request message to the control and processing module 202 when the resource request message is received; and forward the admission control result sent by the NAS and the policy installation result to the converting module 204 when the results are received, where the admission control result indicates whether the resource requested by the resource request message is admitted. The control and processing module 202 is further configured to send the sending module 206 the first request message according to the received resource request message, to request the AN to reserve the program bandwidth. The user ID and the program bandwidth are included in the request message. The converting module 204 is further configured to send the response message of the resource request message to the sending module 206 when the admission control result and the policy installation result sent by the receiving and parsing module are received. The sending module 206 is further configured to send out the response message of the received resource request message; and send the first request message to the NAS.

The receiving and parsing module 200 is further configured to forward the resource request message to the control and processing module 202 when the resource request message is received; and forward the admission control result sent by the NAS and the result of withdrawing the policy to the converting module 204 when the results are received, where the admission control result indicates whether the resource requested by the resource request message is admitted. The control and processing module 202 is further configured to send the sending module 206 the first request message according to the received resource request message, to request the AN to release the program bandwidth. The user ID and the program bandwidth are included in the request message. The converting module 204 is further configured to send the response message of the resource request message to the sending module 206 when the admission control result and the result of withdrawing the policy sent by the receiving and parsing module are received. The sending module 206 is further configured to send out the response message of the received resource request message; and send the first request message to the NAS.

In detail, the first request message can be a DEC message of the COPS protocol, or a corresponding message of the other protocols which can realize the same function.

Figure 14:
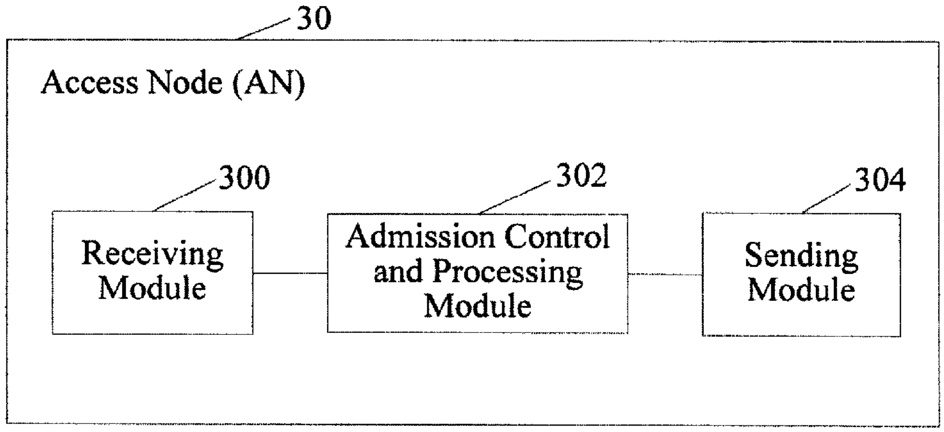
FIG. 14 is a schematic structural view of an access node (AN) according to an embodiment of the present invention.

In an embodiment, the present invention further provides an AN. As shown in FIG. 14, the AN 30 includes an admission control and processing module 302, a sending module 304, and a receiving module 300. The receiving module 300 is configured to forward the first request message sent by the NAS to the admission control and processing module 302 when the first request message is received, requesting performing the admission control on the unicast. The admission control and processing module 302 is configured to perform the admission control on the unicast according to the first request message, and send the sending module 304 the admission control result indicating whether the resource requested by the resource request message is admitted. The sending module 304 is configured to send out the received admission control result.

In detail, the first request message can be a DEC message of the COPS protocol, or a corresponding message of the other protocols which can realize the same function.

Figure 15:
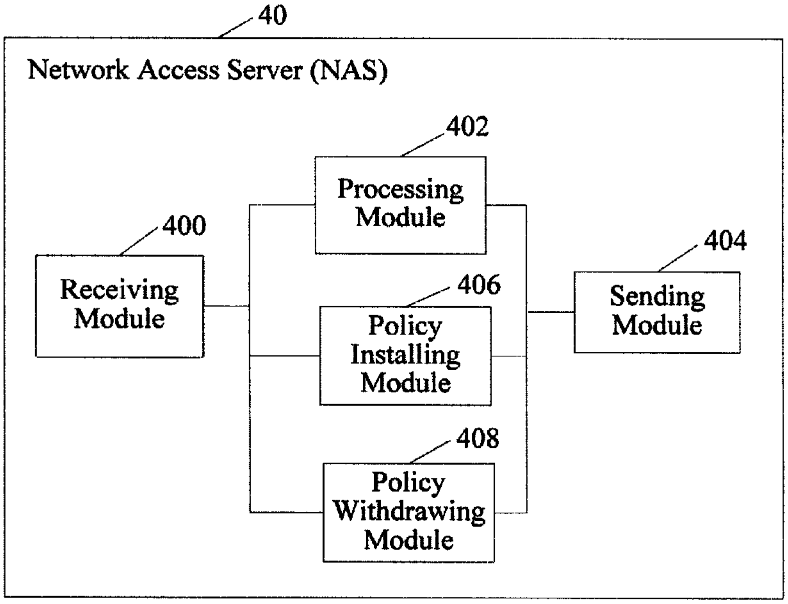
FIG. 15 is a schematic structural view of a network access server (NAS) according to an embodiment of the present invention.

In an embodiment, the present invention further provides an NAS. The NAS can be a BRAS or a BNG. As shown in FIG. 15, the NAS 40 includes a receiving module 400, a processing module 402, and a sending module 404. The NAS can further include a policy installing module 406 and a policy withdrawing module 408.

In detail, the receiving module 400 is configured to send the processing module 402 the first request message from the RM to request the AN to perform the admission control when the first request message is received; and send the processing module 402 the admission control result sent by the AN indicating whether the resource requested by the resource request message is admitted when the result is received. The processing module 402 is configured to perform the protocol conversion according to the first request message, and send the converted first request message to the sending module 404; and perform the protocol conversion according to the received admission control result, and send the converted admission control result to the sending module 404. The sending module 404 is configured to send the converted first request message that is received to the AN; and send the converted admission control result that is received to the RM.

The policy installing module 406 is configured to perform the policy installation according to the policy to be installed in the received first request message requesting to reserve the program bandwidth, and send the result of the policy installation to the sending module 404. The policy withdrawing module 408 is configured to withdraw a policy according to the received first request message requesting to release the program bandwidth, and send the result of withdrawing the policy to the sending module 404. The sending module 404 is further configured to send out the received result of installing or withdrawing the policy.

In detail, the first request message can be a DEC message of the COPS protocol, or a corresponding message of the other protocols which can realize the same function.

With the embodiments of the present invention, the AN is utilized to be responsible for the admission control for the access section including the multicast and unicast services, the multicast admission control and the control execution are completed by the AN, and bandwidth sharing of the AN and the RACS can be realized during the unicast CAC. Furthermore, the communication is performed between the AN and the RACS through the BRAS, so that the network deployment and configuration are simpler. Because the AN reconstruction cost for controlling the AN by the BRAS is small, the reconstruction expenses of the whole network can be saved, and the cost can be reduced. With the embodiments of the present invention, when the multicast/unicast CAC supporting shared bandwidth is realized, processes for configuring user lines between the AN and BRAS are converged, and processes for distributing policies between the RACS and BRAS are converged.

Person of ordinary skill in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a magnetic disk, a compact disk read-only memory (CD-ROM), a read-only memory (ROM), or a random access memory (RAM).

In conclusion, the above are merely preferred embodiments of the present invention. However, the scope of the present invention is not limited thereto. Changes or replacements readily apparent to persons skilled in the prior art within the technical scope of the present invention should fall within the scope of the present invention. Therefore, the protection scope of the present invention is subject to the appended claims.

What is claimed is:

1. A method for managing resources in networks, comprising:

sending, by a resource manager (RM), a first request message according to a received resource request message, to a network access server (NAS), so that the NAS requests an access node (AN) to perform admission control; and sending a response message of the resource request message after receiving an admission control result from the NAS indicating whether a resource requested by the resource request message is admitted;

wherein, the RM sends the first request message to the NAS according to the received resource request message, so that the NAS requests the AN to perform the admission control via an access node control protocol, ANCP, message; the AN performs the admission control, and returns the admission control result indicating whether the resource requested by the resource request message is admitted to the NAS; the NAS performs protocol conversion on the admission control result and sends the result to the RM; and the RM sends the response message of the resource request message after receiving the admission control result sent by the NAS indicating whether the resource requested by the resource request message is admitted;

wherein, the sending the first request message to the NAS, so that the NAS requests the AN to perform the admission control via an ANCP message; and sending the response message of the resource request message after receiving the admission control result sent by the NAS indicating whether the resource requested by the resource request message is admitted comprises:

sending the first request message comprising a policy to be installed by the NAS to the NAS, so that the NAS requests the AN to reserve a program bandwidth via an ANCP message; and sending the response message of the resource request message after receiving the admission control result sent by the NAS indicating whether the resource requested by the resource request message is admitted and a policy installation result.

2. A method for managing resources in networks, comprising:

performing, by a network access server (NAS), access node control protocol, ANCP, protocol conversion on a first request message received from a resource manager (RM); sending the converted ANCP message to an access node (AN) to request the AN to perform admission control; and returning an admission control result to the RM after receiving the admission control result sent by the AN indicating whether a resource requested by the resource request message is admitted;

wherein, the NAS performs the ANCP protocol conversion on the first request message received from the RM; and sends the converted ANCP message to the AN to request the AN to perform the admission control; the AN performs the admission control, and returns the admission control result indicating whether the resource requested by the resource request message is admitted; and the NAS returns the admission control result to the RM after receiving the admission control result;

wherein, the NAS performs the ANCP protocol conversion on the first request message that comprises a policy to be installed and is received from the RM; sends the converted ANCP message to the AN to request the AN to reserve a program bandwidth; and performs policy installation according to the policy to be installed in the first request message after receiving the admission control result sent by the AN indicating whether the resource requested by the resource request message is admitted, and sends the admission control result and a policy installation result to the RM.

3. The method according to claim 2, further comprising:

receiving, by the NAS, an error notification message sent by the AN, performing the protocol conversion on the error notification message, and sending the message to the RM.

4. A communications system, comprising a resource manager (RM), an access node (AN), and a network access server (NAS), wherein:

the RM is configured to send a first request message to the NAS according to a received resource request message, to request the AN to perform admission control; and send a response message of the resource request message after receiving an admission control result sent by the NAS indicating whether a resource requested by the resource request message is admitted;

the NAS is configured to perform access node control protocol, ANCP, protocol conversion on the first request message sent by the RM; send the converted ANCP message to the AN to request the AN to perform the admission control; and send the admission control result to the RM after receiving the admission control result returned by the AN indicating whether the resource requested by the resource request message is admitted; and the AN is configured to perform the admission control according to the ANCP message from the NAS requesting to perform the admission control; and return the admission control result indicating whether the resource requested by the resource request message is admitted to the NAS;

the NAS is further configured to install a policy according to a policy to be installed carried in the first request message sent by the RM after receiving the admission control result returned by the AN, and send the admission control result and the policy installation result to the RM.

5. The communications system according to claim 4, further comprising:

a service server, configured to send the resource request message to the RM to request to perform the admission control; and receive the response message of the resource request message sent by the RM.

6. The communications system according to claim 5, wherein, the AN is further configured to send an error notification message to the NAS when detecting an error;

the NAS is further configured to perform the protocol conversion on the received error notification message sent by the AN, and report the message to the RM; and the RM is further configured to send the received error notification message to the service server.

* * * * *